Oct. 13, 1942.   J. A. GITS ET AL   2,298,364
MOLDED NAME PLATE
Filed March 12, 1938   2 Sheets-Sheet 1
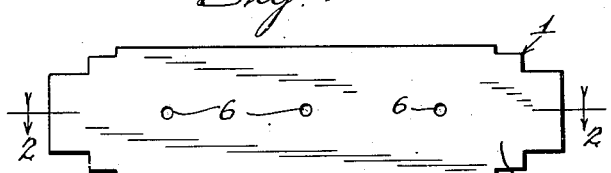
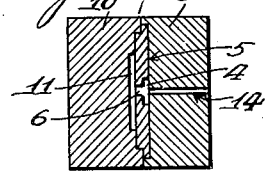
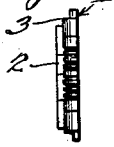
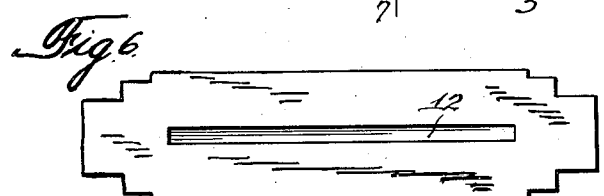
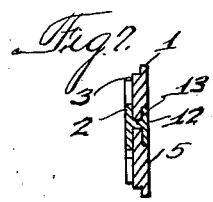
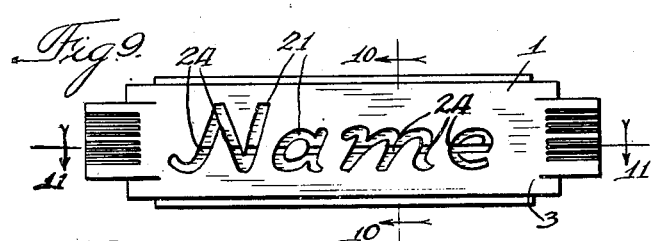
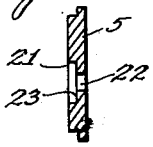
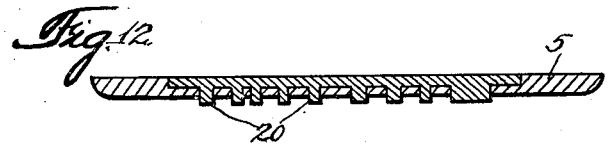
Inventors:
Joseph A. Gits
Jules P. Gits
By Ams, Phues, Olson & Muchlensberger Attys.

Oct. 13, 1942. J. A. GITS ET AL 2,298,364
MOLDED NAME PLATE
Filed March 12, 1938 2 Sheets-Sheet 2
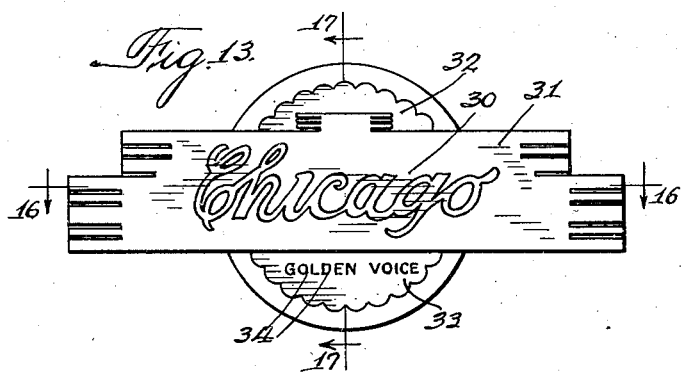
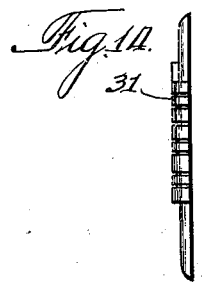
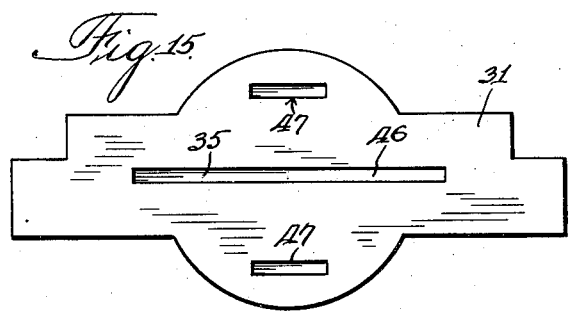
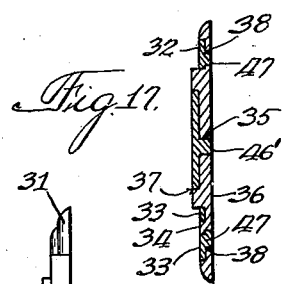
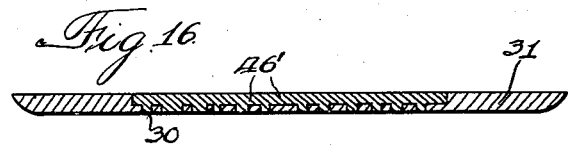
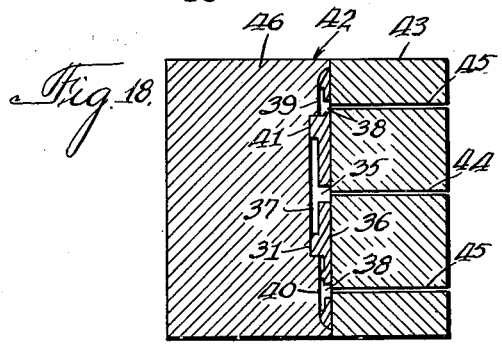
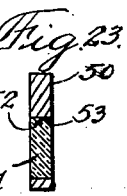
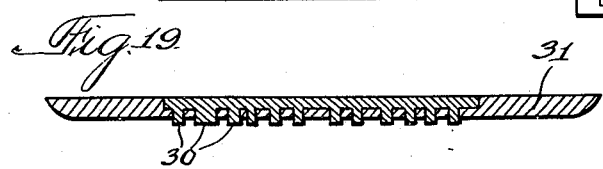
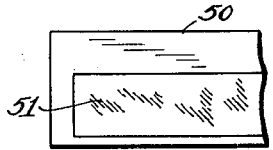
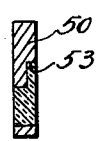
Inventors
Joseph A. Gits
Jules P. Gits
By Ames, Phies, Olson + Mecklenburg Attys Patented Oct. 13, 1942

2,298,364

UNITED STATES PATENT OFFICE 2,298,364

MOLDED NAME PLATE

Joseph A. Gits and Jules P. Gits, Chicago, Ill., assignors to Gits Molding Corporation, Chicago, Ill., a corporation of Illinois Application March 12, 1938, Serial No. 195,504

11 Claims. (Cl. 40—136)

This invention relates to name plates or like articles, and is directed more particularly to an improved construction wherein characters, insignia or other surfaces are formed upon the plate in a distinctive and novel manner.

The invention has been illustrated herein as being embodied in name plates and therefore as being particularly adapted thereto, but it will be understood that the invention is not necessarily limited in its application and usefulness to name plates, but may be used elsewhere.

Name plates are commonly molded of plastic materials and are widely used at the present time. Before the molding operation, pigments are frequently added to the plastic materials to obtain the color desired. The name, characters or other insignia are formed upon the plates in the molds in a single operation, the characters or insignia being formed by being recessed in or by being molded upon the surface in relief. Any attempt to secure a proper contrasty effect between the characters and the name plate by painting either the characters or the name plate has met with difficulty and has failed to produce satisfactory results. Cellulose compositions particularly will not satisfactorily retain paint upon their surfaces. The paint may adhere temporarily but any subsequent handling will not only soil the same but cause it to be quickly worn free. Moreover, painting operations involve labor and are costly. If the name plates are dipped and then wiped, there is a considerable loss. Wiping will invariably remove portions of the paint from the surfaces to be painted and often an undesirable smeary appearance will result. It is a step that is difficult for a workman to perform. If raised or inlaid surfaces are on the plates for decorative purposes, and are not to receive the same color as the characters or the plates or other insignia, painting by dipping cannot be resorted to. Hand painting with a brush is likewise laborious and involves many difficulties from a production standpoint. The same is true whether the name or insignia is inlaid or carried upon the plate in relief.

An essential object of this invention is to provide a construction and a method for producing the same, that will overcome the difficulties above noted and permit the manufacture of molded name plates, as well as other articles, in a simple and inexpensive manner and have a name or other insignia molded upon the plate as an integral part thereof but of a different color, if desired, than that of the plate. Moreover, different portions of the name plate that are provided for decorative purposes and not a part of the name, characters or insignia upon the plate, may be likewise formed of different colors so as to carry out the decorative scheme along extensive lines.

A further object of this invention resides in the simple operation of securing the aforesaid results by a second molding operation but in a manner effecting a bond between the portions of the first and second operations that will be permanent, and, for all essential purposes, will give the appearance of being made in one operation, the portions also appearing to be of the same material except for their difference in color.

Specifically, the invention is to be noted for the type of bond secured that makes separation of the different portions practically impossible. The portions formed by the second operation are so intimately united with the name plate, by the bonding action produced, that it is physically impossible to effect a separation without destruction.

Although a bonding action securing a mechanical interlock between the characters or other insignia and the name plate is also disclosed, it will be understood that the manner in which the molding operation is performed may, in itself, secure a bond that will effectively unite the parts into one unit and prevent their easy separation.

The type of mechanical interlock between the characters or other insignia and the name plates, which we have disclosed herein, is, however, a feature of the invention that is considered of importance and has advantage and benefits which are of much value in this kind of work.

Other objects and advantages of the invention will be noted from the following detail description of the invention when taken in connection with the accompanying drawings which form a part hereof.

In the drawings:

Figure 1 is an elevation of a name plate looking at its front face before any characters or symbols are formed thereon;

Fig. 2 is a horizontal sectional view taken on line 2—2 of Fig. 1;

Fig. 3 is a vertical sectional view taken through a mold in which this name plate has been placed for a second molding operation;

Fig. 4 illustrates the name plate in finished form after the second molding operation;

Fig. 5 is an end view of the same;

Fig. 6 is an elevation of the rear face of this finished name plate;

Fig. 7 is a vertical sectional view taken on line 7—7 of Fig. 4;

Fig. 8 is a horizontal sectional view taken on line 8—8 of Fig. 4;

Fig. 9 is a slightly modified form of name plate before characters or symbols are formed thereon, having recesses therein conforming to the characters to be formed;

Fig. 10 is a vertical sectional view taken on line 10—10 of Fig. 9;

Fig. 11 is a horizontal sectional view taken on line 11—11 of Fig. 9;

Fig. 12 is a view similar to Fig. 11 but after the second operation forming the letters or symbols;

Fig. 13 illustrates a further variant embodiment of the invention;

Fig. 14 is an end view of the same;

Fig. 15 is a view of the rear face of the same;

Fig. 16 is a horizontal sectional view taken on line 16—16 of Fig. 13;

Fig. 17 is a vertical sectional view taken on line 17—17 of Fig. 13;

Fig. 18 illustrates the type of name plate that is shown in Fig. 13 positioned in a mold and ready for a second operation to form the characters and other surfaces thereon;

Fig. 19 is a horizontal sectional view of a name plate of the type shown in Fig. 13 but illustrating the characters in slight relief instead of being flush;

Fig. 20 is an end view of the name plate shown in Fig. 19;

Fig. 21 is a view of a further embodiment of the invention as applied to surfaces adapted to have transparent markings or calibrations thereon;

Fig. 22 is a rear view of the same;

Fig. 23 is a vertical sectional view of the same taken through the layer markings; and Fig. 24 is a vertical sectional view taken through the smaller calibrations.

Name plates and articles capable of embodying the present invention are usually adapted to have their characters, symbols or surfaces formed or carried upon their front face in various ways. According to the invention, these letters, symbols or surfaces may be either inlaid and formed in relief or flush with the surface, or not inlaid and formed upon the surface in relief only. Accordingly, it may be mentioned at the outset with respect to a broad aspect of the invention that it is immaterial how these characters, symbols or faces are formed or carried and that the features of the invention may be incorporated in various types of structures whether they comprise name plates or other articles wherein it is desirable to form component parts thereof out of differently colored material by separate molding operations to make them in effect appear as an integral part of the plate or article, although being material of different color and formed by a separate molding operation.

Fig. 1 illustrates a name plate 1 before the molding operation forming the characters. Fig. 4 illustrates name plate 1 in its finished form after the characters are formed. In this illustration, however, letters designated 2 are formed in relief upon front face 3, the latter being substantially smooth and against which the letters 3 are held. A recess 4 is formed in rear face 5. A plurality of passages or small openings 6 place recess 4 in communication with front face 3. As will be described presently, formation of recess 4 and the provision of passages 6 will depend upon the manner in which letters 2 are to be formed upon front face 1. If letters 2 are to form a word written in script, passages 6 are provided in any desired number, irrespective of whether the plate 1 is recessed to receive a portion of the material forming letters 2 as will be hereinafter described, or whether these letters 2 are carried against front face 1, as shown in Fig. 4.

After plate 1, as shown in its form in Fig. 1, is formed, it is placed in a second mold 8 so that its rear face 5 is positioned against the face of the mold's matrix 9 and opening 6 communicates with a cavity 11 cut in patrix 10. Cavity 11 corresponds to the letters or characters of the word or symbol to be molded upon front face 1. One or more passages 14 in matrix 9 communicate with recess 4 and the source of supply of the plastic composition. It is this plastic composition that is of a different color than plate 1 and it preferably enters recess 4, opening 6 and cavity 11 by an injection operation under a relatively high pressure. For example, we have found pressures in the order of thirteen to fifteen tons per square inch may be advantageously used to insure that the molten material will be forced into all portions of cavity 11 and that a bond will be, by reason of this high pressure, formed between the letters 2 and plate 1 that will firmly hold the letters against the plate and prevent their separation independently of any mechanical interlocking key means herein disclosed.

The arrangement of recess 4 in rear face 5 advantageously furnishes, however, key means 12 in the shape of an integrally formed strip that may lie substantially the length of the word or symbol formed by letters 2. This strip 12 is integrally interlocked with letters 2 by the connections 13 formed by this material of the second operation filling passages 6.

Although recess 4 may be of any cross-sectional shape or configuration, we find that the mechanical interlocking action or keying may be materially strengthened or made more efficient by providing passages 6 of different cross-section than recess 4. Consequently, extensions 13 will be of different shape cross-sectionally than strip 12, which prevents any tendency for letters 2 to be stripped from front face 3. In other words, not only will injection-molding under high pressure in itself provide a bond of adequate strength to unite letters 2 to the front face 3 of plate 1 but the mechanical interlocking action furnished by extensions 13 and strip 12 will mechanically interlock letters 2 with plate 1 so as to make them an integral-like part of the plate. A product or article is thereby produced that comprises in effect a base or background of one material or color and characters or symbols carried thereby of the same or different material or of a different color, so as to produce the appearance of a structure whose characters or symbols are an integral part thereof but have a definitely different appearance or color than the base. An exceptionally firm bond or mechanical interlock is provided to assure that the characters will not be separated from the base. The advantages of the construction are numerous. Characters or symbols may be formed upon a name plate that will be of a different color than that of the base and will thereby present a desirable contrasty appearance without any possibility of the color changing or being removed which was heretofore experienced when the characters or symbols were painted. A very neatly finished product is obtained that has a proper finished appearance and which may be produced at a greatly reduced cost and eliminate the labor difficulties of painting operations.

As stated above, the letters or characters forming the symbol or other indicia to be formed upon the name plate may have a portion thereof embedded in a recess in the front face of the plate. Such a construction is illustrated in Figs. 9 to 12, inclusive. In this instance, plate 1 is provided in its first molding operation with a recess or plurality of recesses 21 in its front face 3 corresponding to the shape or configuration of the letters or characters to be formed. If desired, these letters or characters may be individually formed, as shown at 20 in Fig. 12, and not connect with each other, as shown in Fig. 4. Plate 1 will, therefore, be formed with a plurality of recesses 21, each corresponding to some portion of the symbol, such as each letter of the name to be formed. Rear face 5 will be provided with a recess 22 extending somewhat lengthwise of the area covered by the word to be formed on front face 1. Recess 22 may be so formed in plate 1 as to extend at least to the floor 23 of recess 21 and thereby be in communication therewith. It will be observed that each recess 21 will have one or more openings 24 with recess 22. Floor 23 of these recesses will be cut away where these recesses intersect with recess 22. Adequate communication between recess 22 and recesses 21 will be provided to assure a proper flow of material into recesses 21 to form letters 20. If these letters 20 are to be formed in relief with respect to front face 3 of plate 1, the patrix 10 of mold 8 may likewise have corresponding cavities 11 that will form the individual letters 20. Again, plate 1 is placed in mold 8 for a second injection operation to secure a flow of the differently colored material forming words 20 through recess 22 and then into the recesses 21.

A device embodying the present invention may not only have letters or characters forming symbol or like indicia of a differently colored material thereon but may have a surface ornamentation likewise constructed. Such a structure is shown in Figs. 13 to 18, inclusive. It may comprise, for example, letters 30 forming a trade name or like indicia that is of a differently colored material than plate 31, and also comprise a number of surfaces 32 and 33 formed of a still differently colored material, it also being possible to form additional lettering 34 upon surface 33 of the same or different color than that of the letters 30. Letters 30 are formed in a second molding operation in the same manner as above explained. Plate 31 is first molded with a recess 35 in rear face 36 extending inwardly in the body of plate 31 to intersect the floor of recesses 37. Also, additional recesses 38 similar to that of recess 35 may be provided in plate 31 at the rear face 36 to communicate with recesses 39 and 40 formed in front face 41. This is clearly shown in Figs. 17 and 18. In the second molding operation, plate 31 is placed in a mold 42, illustrated in Fig. 18. Patrix 43 may have a series of passages 44 and 45 communicating with recesses 35 and 38, respectively. The patrix 46 may, in this instance, receive plate 31 by having the proper cavity formed in its face. If preferred, the arrangement may provide letters 30 and surfaces 32 and 33 flush with the front face of the plate instead of in relief, as shown in the variant embodiments above described. It will be understood that the formation of the letters 30 and surfaces 32 and 33 with respect to whether they will be flush, recessed or in relief will depend upon the manner in which the cavities are formed in the molds.

In this second injection-molding operation, the differently colored material forming letters 30 will not only fill recesses 37 in the front face of plate 31 but also recess 35 formed at the rear face 36. This material will form a mechanical interlocking key 46′ in recess 35 that will securely hold letters 30 in their recesses 37 although it will be understood that injection-molding under high pressure may effectively form a bond that will prevent letters 30 from being displaced from their recesses 37 independently of key means 46′. Again recess 35 may assume any proper shape to perform its function and permit adequate access to recesses 37 to assure an efficient and proper flow of the material into said recesses 37.

Injecting the material into recesses 39 and 40 to form surfaces 32 and 33 may be performed during the same injection-operation forming letters 30 or by another operation, if so desired. Also, the material injected into recesses 39 and 40 will form key means 47 in recesses 38 that will provide the proper mechanical interlocking action to keep surfaces 32 and 33 firmly held in recesses 39 and 40. It will be understood, however, that recesses 38 extending lengthwise of surfaces 32 and 33 may be dispensed with and other communication with front recesses 39 and 40 provided. Instead of a single recess 38 for each surface 32 and 33 one or more openings (similar to openings 6) extending through back wall 36 into recesses 39 and 40 will suitably serve the purpose. This is a matter of construction and choice.

As shown in the drawings, letters 34 are molded or formed as a part of plate 31. See Fig. 17. However, letters 34 may be formed during the second molding operation to be given a different color or appearance instead of surface 33, or surface 33 may be formed in the second molding operation and thereafter letters 34 in a subsequent operation. This is a matter of choice.

Figs. 19 and 20 further illustrate a construction substantially the same as shown in Figs. 13 to 17, inclusive. However, letters 30 project slightly in relief upon the front face of plate 31. As stated previously, it will be apparent that any desirable arrangement in this connection may be provided without departing from the scope of the invention. The same is true with such surfaces as 32 and 33, shown in Fig. 13.

A device made in accordance with this invention may be subjected to any number of molding operations. Surfaces like 32 and 33 and characters like any of those herein described, or other types or kinds of symbols that are possible to form, may be made in more than one or two colors. Certain surfaces or characters on a single article may be both inlaid and in relief. The combinations are numerous as will be apparent from the foregoing description and a proper understanding of the invention and the advantages and benefits obtained.

Not only has a new product been produced, but also a novel process devised that efficiently and economically produces this new product and overcomes many difficulties heretofore experienced.

The value of the present process in obtaining name plates or like articles with differently colored combinations of parts that go to make up these name plates or like articles in a simple and economical manner is pointed out. These plates or articles have a finished appearance that, with their color variances, make them very attractive and exceedingly useful.

The letters, characters, symbols, surfaces, or whatever may be formed by the second operation, have the appearance of being an integrally formed component part of the product. This has value and importance, not only from the construction and sales standpoints, but also from the use thereof and the appeal it presents.

Figs. 21 to 24 illustrate a further possible embodiment of the invention in the form of a dial 50 having markings or calibrations 51 formed therein that are transparent or translucent and capable of illumination by a light disposed at the rear of the dial. The construction of dial 50 and markings 51 is substantially the same as described in connection with other embodiments disclosed herein. If desired, dial 50 is provided with a recess or recesses 52 in the front face corresponding to the markings 51. It is then provided with a longitudinal recess 53 in the rear face preferably of a height at least equal to markings 51 and of a length to include all the marking across the front face. It will be understood, however, that this recess 53 in the rear face may be made up of any number of recesses or parts thereof as long as its intended purpose will be accomplished. This recess 53 in the rear face is preferably of a depth to intersect the recesses 52 in the front face so that the arrangement results in the front recesses 52 opening into the rear recess 53, as shown in Figs. 23 and 24. Dial 50 is then placed in a mold and these recesses are filled with a transparent or translucent material, the material in the rear recess forming a key to lock the markings 51 against displacement, it being noted that the shape of the rear recess 53 renders displacement of the transparent material forming the markings 51 in the front recesses 52 impossible. Hence, a dial construction may be conveniently and inexpensively provided that may be of any shape but which will have transparent markings or calibrations permitting rear illumination.

It is to be understood that the disclosure of the process herein described and claimed and of its variant embodiments is a disclosure of any product or products that may be produced thereby.

Without further elaboration, the foregoing will so fully explain the gist of our invention that others may, by applying current knowledge, readily adopt the same for use under varying conditions of service, without eliminating certain features, which, may properly be said to constitute the essential items of novelty involved, which items are intended to be defined and secured to us by the following claims.

We claim:

1. An ornamental name plate of the character described comprising a body having relatively opposed faces, alphabetical characters or other indicia formation upon one of the faces comprising any one or more of the letters of the alphabet or other formations with completely enclosed portions like that of the letter "B," extensions on said alphabetical characters disposed in said body, said extensions being disposed at more than one place along said alphabetical characters, and an elongated strip of different configuration than the characters or other indicia formations disposed along the opposite face and connected to said extensions, said extensions being of different dimensions than said alphabetical characters and said strip.

2. A product adapted to have any of the alphabetical characters or other like indicia formations including characters or formations having completely enclosed portions like that of the letter "P" comprising a body provided with a front face and a rear face, recesses in the front and rear faces having side walls and a floor, said recesses communicating with each other by limited openings occupying a portion only of the floor area of the front recess, and material of a color different than the color of said body in said recesses presenting alphabetical characters or other like indicia formations, the contacting surfaces of the body and the material being so intimately united that the alphabetical characters or other indicia formations distinguish from said body by apparent color separation only.

3. A product having any of the alphabetical characters or other like indicia including characters or formations provided with completely enclosed portions and wherein such characters or other indicia are of continuous formation and appear to be an integral part of the body and distinguished only by an apparent color separation comprising a body of plastic material having front and rear faces, recesses in said faces having definitely formed floors embedded in said body the recess in the rear face being of a different configuration than the character or indicia recess in the front face, there being openings between the floor in the front recess and the floor in the rear recess where the rear recess intercepts the front recess, and a molded plastic material of a contrasting color with respect to the color of said body in said recesses, said molded plastic material being embedded in said recesses to form a permanent bond between the same and the body with intimately contacting surfaces.

4. An ornamental plate or object molded of plastic material having portions of contrasting colors on the front face of the body that appear to be a part of the body and distinguish by apparent color separation only comprising a body of plastic material having recesses in its front face of varied configurations and of a depth less than the thickness of the body, said recesses having definitely formed floors that are disposed a distance within the body in a manner to form completely enclosed portions that constitute a part of said body face, a recess of different configuration in another face of said body having communicating openings with said recesses in the front face, said openings being of a size substantially less than the floor area of said recesses in the front face, and a molded plastic product of a color contrasting with the color of the plate in said recesses that distinguishes from the plate by an apparent color separation only.

5. An ornamental plate or object molded of plastic material having portions of contrasting colors on the front face of the body that appear to be a part of the body and distinguish by apparent color separation only, said portions including alphabetical characters or formations having completely enclosed portions like the letter "B," said plate comprising a body of plastic material having a recess in its front face, said recess being of a configuration representing the alphabetical character or formation to be formed, a recess of different configuration in the rear face of said body, said recesses being of a combined depth equal substantially to the thickness of said body whereby said recesses open into each other where their floors intercept, and a plastic material of a color contrasting with the color of said body in said recesses, said plastic material being embedded in said recesses so that the contacting surfaces between said recesses and said body intimately unite to give an appearance distinguishable only by an apparent color separation.

6. An ornamental plate or object molded of plastic material having portions of contrasting colors on the front face of the body that include alphabetical characters or formations having completely enclosed portions like the letter "B," said plate comprising a body of plastic material having a recess in its front face of a configuration representing the alphabetical character or formation to be formed, a recess of a different configuration in the rear face of said body, said recesses being of a combined depth equal substantially to the thickness of said body whereby said recesses open into each other at limited points where the recess in the front face crosses and intercepts the recess in the rear face, and a plastic material of a color contrasting with the color of said body in said recesses.

7. A plastic product having alphabetical or other like indicia formations arranged in a decorative manner and disposed upon the front face in a contrasting color effect with said front face which comprises a body composed of plastic material having a front face and a rear face, a recess in the front face and a recess in the rear face having a combined depth substantially equal to the thickness of the body, the recess in the rear face being so arranged that the floors of both recesses will intercept at limited points and provide limited openings therebetween, each opening occupying a portion only of the floor area of the front recess, and a molded mass of plastic material of a different color than the color of said body permanently embedded in said recesses, the molded mass of plastic material in the recess in the front face presenting alphabetical or like indicia formations distinguishing from said body by apparent color separation only.

8. A name plate having aliphatical formations or other like indicia portions disposed upon the front face of the plate in contrasting colors comprising a plate of a plastic material having a finished front face and a rear face, a recess in the finished front face of the contour of an alphabetical formation or other indicia portion, a recess of different configuration in the rear face extending crosswise of the area occupied by the recess in the front face and of a depth to intercept and communicate with the recess in the front face by a restricted opening, said opening occupying a portion only of the floor area of the recesses in the front and rear faces, and a molded mass of plastic material of a contrasting color compressedly injected in said recesses in the front and rear faces and forming a permanent bond therewith, the contacting surfaces of the plate and the plastic material of contrasting color being so intimately united that the separation between the plate and the plastic material of contrasting color appear to be one of color separation only.

9. A name plate having alphabetical formations or other like indicia portions disposed upon the front face of the plate in contrasting colors comprising a plate of a plastic material having a front and a rear face, a recess in the front face of the contour of an alphabetical or like formation, a recess in the rear face of a width less than the height of the recess in the front face extending crosswise of the area occupied by the recess in the front face and intercepting the same at one or more points to provide restricted opening or openings therewith, a molded mass of plastic material of a contrasting color in both said recesses in the front and the rear faces, the contacting surfaces of the plate and the plastic material of contrasting material being so intimately affixed to each other that separation between the plate and the plastic material of contrasting color appears to be one of color only.

10. A molded name plate of plastic material having one or more alphabetical characters that may comprise any one or more of the letters of the alphabet including such letters as the letter "B" with one or more completely enclosed portions, said name plate comprising a molded body provided with front and rear faces, a recess in the rear face communicating with the front face by limited openings, and one or more alphabetical characters of the type described disposed along the front face and formed of a body of molded plastic material extending through said openings and lying in said recess, each said alphabetical character being of a continuous formation along the front face with said extensions in said communicating openings extending rearwardly from said continuous character formation at predetermined spaced points therealong, the portions of said character formations between said spaced points being continuous upon said front face of said name plate body, the contacting walls between said plastic material and said name plate body being so intimately united that said characters appear to form an integral part of said name plate body along its said front face.

11. A decorated article comprising a plastic base having an opening therethrough, and plastic material extending through said opening and provided with a head on each side of the said base, whereby said plastic material is locked in position on said base, said base being provided with a recess aligned with said opening on one side of said base, the head of plastic material on that side of the base being located entirely in the said recess, and presenting a surface substantially continuous with the surface of that side of the base, the head of plastic material on the other side of the base presenting a surface parallel to that of said other side of the base.

JOSEPH A. GITS.
JULES P. GITS.